United States Patent
Artes et al.

(10) Patent No.: US 12,140,965 B2
(45) Date of Patent: Nov. 12, 2024

(54) METHOD FOR CONTROLLING AN AUTONOMOUS MOBILE ROBOT

(71) Applicant: RobArt GmbH, Linz (AT)

(72) Inventors: Harold Artes, Linz (AT); Michael Schahpar, Linz (AT); Dominik Seethaler, Linz (AT); Reinhard Vogel, Linz (AT); Daniel Bartel, Linz (AT)

(73) Assignee: RoTrade Asset Management GmbH, Leonding (AT)

( * ) Notice: Subject to any disclaimer, the term of this patent is extended or adjusted under 35 U.S.C. 154(b) by 818 days.

(21) Appl. No.: 16/323,308

(22) PCT Filed: Aug. 4, 2017

(86) PCT No.: PCT/EP2017/069827
§ 371 (c)(1),
(2) Date: Dec. 3, 2020

(87) PCT Pub. No.: WO2018/024897
PCT Pub. Date: Feb. 8, 2018

(65) Prior Publication Data
US 2021/0096579 A1   Apr. 1, 2021

(30) Foreign Application Priority Data

Aug. 5, 2016 (DE) ..................... 10 2016 114 593.9
Aug. 5, 2016 (DE) ..................... 10 2016 114 594.7

(51) Int. Cl.
*G05D 1/02* (2020.01)
*G01C 21/00* (2006.01)
*G05D 1/00* (2006.01)

(52) U.S. Cl.
CPC ......... *G05D 1/0274* (2013.01); *G01C 21/383* (2020.08); *G05D 2201/0203* (2013.01)

(58) Field of Classification Search
CPC ......... G05D 1/0274; G05D 2201/0203; G01C 21/206
See application file for complete search history.

(56) References Cited

U.S. PATENT DOCUMENTS 4,674,048 A   6/1987 Okumura
4,740,676 A   4/1988 Satoh et al.
(Continued)

FOREIGN PATENT DOCUMENTS

AU   2015322263   4/2017
CA    2322419    9/1999
(Continued)

OTHER PUBLICATIONS

Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.
(Continued)

*Primary Examiner* — Ryan Rink
(74) *Attorney, Agent, or Firm* — Akerman LLP; Peter A. Chiabotti

(57) ABSTRACT

A method for controlling an autonomous mobile robot. According to one exemplary embodiment, the method comprises the storage and management of at least one map associated with an area of use for the robot and the navigation of the robot through the area of use for the robot, wherein the robot continuously determines its position on the map. The method further comprises the detection of a repositioning procedure, during which the robot carries out a movement that the robot itself cannot control. During this repositioning procedure, the robot detects information about its position and/or its state of motion with the aid of sensors and, based on the detected information, determines an estimated value for its position.

5 Claims, 4 Drawing Sheets

(56) References Cited

U.S. PATENT DOCUMENTS

| | | |
|---|---|---|
| 4,777,416 A | 10/1988 | George, II et al. |
| 5,109,566 A | 5/1992 | Kobayashi et al. |
| 5,260,710 A | 11/1993 | Omamyuda et al. |
| 5,284,522 A | 2/1994 | Kobayashi et al. |
| 5,377,106 A | 12/1994 | Drunk et al. |
| 5,402,051 A | 3/1995 | Fujiwara et al. |
| 5,696,675 A | 12/1997 | Nakamura et al. |
| 5,787,545 A | 8/1998 | Colens |
| 5,995,884 A | 11/1999 | Allen et al. |
| 6,366,219 B1 | 4/2002 | Hoummady |
| 6,389,329 B1 | 5/2002 | Colens |
| 6,532,404 B2 | 3/2003 | Colens |
| 6,594,844 B2 | 7/2003 | Jones |
| 6,605,156 B1 | 8/2003 | Clark et al. |
| 6,615,108 B1 | 9/2003 | Peless et al. |
| 6,667,592 B2 | 12/2003 | Jacobs et al. |
| 6,690,134 B1 | 2/2004 | Jones et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,965,209 B2 | 11/2005 | Jones et al. |
| 6,972,834 B1 | 12/2005 | Oka et al. |
| 7,155,308 B2 | 12/2006 | Jones |
| 7,173,391 B2 | 2/2007 | Jones et al. |
| 7,196,487 B2 | 3/2007 | Jones et al. |
| 7,302,345 B2 | 11/2007 | Kwon et al. |
| 7,388,343 B2 | 6/2008 | Jones et al. |
| 7,389,156 B2 | 6/2008 | Ziegler et al. |
| 7,448,113 B2 | 11/2008 | Jones et al. |
| 7,483,151 B2 | 1/2009 | Zganec et al. |
| 7,507,948 B2 | 3/2009 | Park et al. |
| 7,539,557 B2 | 5/2009 | Yamauchi |
| 7,571,511 B2 | 8/2009 | Jones et al. |
| 7,636,982 B2 | 12/2009 | Jones et al. |
| 7,656,541 B2 | 2/2010 | Waslowski et al. |
| 7,761,954 B2 | 7/2010 | Ziegler et al. |
| 7,801,676 B2 | 9/2010 | Kurosawa et al. |
| 8,438,695 B2 | 5/2013 | Gilbert et al. |
| 8,594,019 B2 | 11/2013 | Misumi |
| 8,739,355 B2 | 6/2014 | Morse et al. |
| 8,855,914 B1 | 10/2014 | Alexander et al. |
| 8,892,251 B1 | 11/2014 | Dooley et al. |
| 8,921,752 B2 | 12/2014 | Iizuka |
| 8,982,217 B1 | 3/2015 | Hickman |
| 9,002,511 B1 | 4/2015 | Hickerson et al. |
| 9,026,302 B2 | 5/2015 | Stout et al. |
| 9,037,294 B2 | 5/2015 | Chung et al. |
| 9,043,017 B2 | 5/2015 | Jung et al. |
| 9,149,170 B2 | 10/2015 | Ozick et al. |
| 9,220,386 B2 | 12/2015 | Gilbert, Jr. et al. |
| 9,486,924 B2 | 11/2016 | Dubrovsky et al. |
| 9,717,387 B1 | 8/2017 | Szatmary et al. |
| 10,228,697 B2 | 3/2019 | Yoshino |
| 11,119,496 B1 * | 9/2021 | Ebrahimi Afrouzi ........................ G05D 1/0217 |
| 2002/0016649 A1 | 2/2002 | Jones |
| 2002/0103575 A1 | 8/2002 | Sugawara |
| 2002/0120364 A1 | 8/2002 | Colens |
| 2003/0025472 A1 | 2/2003 | Jones et al. |
| 2003/0030398 A1 | 2/2003 | Jacobs et al. |
| 2003/0034441 A1 | 2/2003 | Kang et al. |
| 2003/0120389 A1 | 6/2003 | Abramson |
| 2003/0142925 A1 | 7/2003 | Melchior et al. |
| 2004/0020000 A1 | 2/2004 | Jones |
| 2004/0049877 A1 | 3/2004 | Jones et al. |
| 2004/0187457 A1 | 9/2004 | Colens |
| 2004/0207355 A1 | 10/2004 | Jones et al. |
| 2005/0000543 A1 | 1/2005 | Taylor et al. |
| 2005/0010331 A1 | 1/2005 | Taylor et al. |
| 2005/0041839 A1 | 2/2005 | Saitou et al. |
| 2005/0067994 A1 | 3/2005 | Jones et al. |
| 2005/0156562 A1 | 7/2005 | Cohen et al. |
| 2005/0171636 A1 | 8/2005 | Tani |
| 2005/0171644 A1 | 8/2005 | Tani |
| 2005/0204717 A1 | 9/2005 | Colens |
| 2005/0212680 A1 | 9/2005 | Uehigashi |
| 2005/0256610 A1 | 11/2005 | Orita |
| 2006/0012493 A1 | 1/2006 | Karlsson et al. |
| 2006/0020369 A1 | 1/2006 | Taylor |
| 2006/0095158 A1 | 5/2006 | Lee et al. |
| 2006/0237634 A1 | 10/2006 | Kim |
| 2007/0027579 A1 | 2/2007 | Suzuki et al. |
| 2007/0061041 A1 | 3/2007 | Zweig |
| 2007/0234492 A1 | 10/2007 | Svendsen et al. |
| 2007/0266508 A1 | 11/2007 | Jones et al. |
| 2007/0282484 A1 | 12/2007 | Chung et al. |
| 2008/0046125 A1 | 2/2008 | Myeong et al. |
| 2008/0140255 A1 | 6/2008 | Ziegler et al. |
| 2008/0155768 A1 | 7/2008 | Ziegler et al. |
| 2008/0192256 A1 | 8/2008 | Wolf et al. |
| 2008/0307590 A1 | 12/2008 | Jones et al. |
| 2009/0048727 A1 | 2/2009 | Hong et al. |
| 2009/0051921 A1 | 2/2009 | Masahiko |
| 2009/0143912 A1 | 6/2009 | Wang et al. |
| 2009/0177320 A1 | 7/2009 | Lee et al. |
| 2009/0182464 A1 | 7/2009 | Myeong et al. |
| 2009/0281661 A1 | 11/2009 | Dooley et al. |
| 2010/0030380 A1 | 2/2010 | Shah et al. |
| 2010/0049365 A1 | 2/2010 | Jones et al. |
| 2010/0082193 A1 | 4/2010 | Chiappetta |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0324731 A1 | 12/2010 | Letsky |
| 2010/0324736 A1 | 12/2010 | Yoo et al. |
| 2011/0054689 A1 | 3/2011 | Nielsen et al. |
| 2011/0137461 A1 | 6/2011 | Kong et al. |
| 2011/0194755 A1 | 8/2011 | Jeong et al. |
| 2011/0211731 A1 | 9/2011 | Lee et al. |
| 2011/0224824 A1 | 9/2011 | Lee et al. |
| 2011/0231018 A1 | 9/2011 | Iwai et al. |
| 2011/0236026 A1 | 9/2011 | Yoo et al. |
| 2011/0238214 A1 | 9/2011 | Yoo et al. |
| 2011/0264305 A1 | 10/2011 | Choe et al. |
| 2011/0278082 A1 | 11/2011 | Chung et al. |
| 2011/0295420 A1 | 12/2011 | Wagner |
| 2012/0008128 A1 | 1/2012 | Bamji |
| 2012/0013907 A1 | 1/2012 | Jung et al. |
| 2012/0022785 A1 | 1/2012 | DiBernardo et al. |
| 2012/0060320 A1 | 3/2012 | Lee et al. |
| 2012/0069457 A1 | 3/2012 | Wolf et al. |
| 2012/0169497 A1 | 7/2012 | Schnittman et al. |
| 2012/0173070 A1 | 7/2012 | Schnittman |
| 2012/0215380 A1 | 8/2012 | Fouillade et al. |
| 2012/0223216 A1 | 9/2012 | Flaherty et al. |
| 2012/0265370 A1 | 10/2012 | Kim et al. |
| 2012/0271502 A1 | 10/2012 | Lee et al. |
| 2012/0283905 A1 | 11/2012 | Nakano et al. |
| 2013/0000675 A1 * | 1/2013 | Hong ................... G05D 1/0274 15/49.1 |
| 2013/0001398 A1 | 1/2013 | Wada et al. |
| 2013/0024025 A1 * | 1/2013 | Hsu ..................... G05D 1/0274 901/1 |
| 2013/0166134 A1 | 6/2013 | Shitamoto |
| 2013/0206177 A1 | 8/2013 | Burlutskiy |
| 2013/0217421 A1 | 8/2013 | Kim |
| 2013/0221908 A1 | 8/2013 | Tang |
| 2013/0261867 A1 | 10/2013 | Burnett et al. |
| 2013/0265562 A1 | 10/2013 | Tang et al. |
| 2013/0317944 A1 | 11/2013 | Huang et al. |
| 2014/0005933 A1 | 1/2014 | Fong et al. |
| 2014/0098218 A1 | 4/2014 | Wu et al. |
| 2014/0100693 A1 | 4/2014 | Fong et al. |
| 2014/0115797 A1 | 5/2014 | Duenne |
| 2014/0124004 A1 | 5/2014 | Rosenstein et al. |
| 2014/0128093 A1 | 5/2014 | Das et al. |
| 2014/0156125 A1 | 6/2014 | Song et al. |
| 2014/0207280 A1 | 7/2014 | Duffley et al. |
| 2014/0207281 A1 | 7/2014 | Angle et al. |
| 2014/0207282 A1 | 7/2014 | Angle et al. |
| 2014/0218517 A1 | 8/2014 | Kim et al. |
| 2014/0257563 A1 | 9/2014 | Park et al. |
| 2014/0257564 A1 | 9/2014 | Sun et al. |
| 2014/0257565 A1 | 9/2014 | Sun et al. |

(56) References Cited

U.S. PATENT DOCUMENTS

| | | | |
|---|---|---|---|
| 2014/0303775 A1* | 10/2014 | Oh | B25J 9/0003 901/1 |
| 2014/0316636 A1 | 10/2014 | Hong et al. | |
| 2014/0324270 A1 | 10/2014 | Chan et al. | |
| 2014/0343783 A1 | 11/2014 | Lee | |
| 2015/0006289 A1 | 1/2015 | Jakobson et al. | |
| 2015/0115138 A1 | 4/2015 | Heng et al. | |
| 2015/0115876 A1 | 4/2015 | Noh et al. | |
| 2015/0120056 A1 | 4/2015 | Noh et al. | |
| 2015/0151646 A1 | 6/2015 | Noiri | |
| 2015/0166060 A1 | 6/2015 | Smith | |
| 2015/0168954 A1 | 6/2015 | Hickerson et al. | |
| 2015/0173578 A1 | 6/2015 | Kim et al. | |
| 2015/0202772 A1 | 7/2015 | Kim | |
| 2015/0212520 A1* | 7/2015 | Artes | A47L 11/4011 701/2 |
| 2015/0223659 A1 | 8/2015 | Han et al. | |
| 2015/0250372 A1* | 9/2015 | T P | A47L 9/2826 701/28 |
| 2015/0260829 A1 | 9/2015 | Wada | |
| 2015/0265125 A1 | 9/2015 | Lee et al. | |
| 2015/0269823 A1 | 9/2015 | Yamanishi et al. | |
| 2015/0314453 A1 | 11/2015 | Witelson et al. | |
| 2015/0367513 A1 | 12/2015 | Gettings et al. | |
| 2016/0008982 A1 | 1/2016 | Artes et al. | |
| 2016/0026185 A1 | 1/2016 | Smith et al. | |
| 2016/0027207 A1* | 1/2016 | Hillen | G06T 7/74 348/207.1 |
| 2016/0037983 A1 | 2/2016 | Hillen et al. | |
| 2016/0041029 A1 | 2/2016 | T'ng et al. | |
| 2016/0066759 A1 | 3/2016 | Miele et al. | |
| 2016/0103451 A1 | 4/2016 | Vicenti | |
| 2016/0123618 A1 | 5/2016 | Hester et al. | |
| 2016/0132056 A1 | 5/2016 | Yoshino | |
| 2016/0150933 A1* | 6/2016 | Duenne | A47L 9/2805 15/319 |
| 2016/0165795 A1 | 6/2016 | Balutis et al. | |
| 2016/0166126 A1 | 6/2016 | Morin et al. | |
| 2016/0209217 A1 | 7/2016 | Babu et al. | |
| 2016/0213218 A1 | 7/2016 | Ham et al. | |
| 2016/0214258 A1 | 7/2016 | Yan | |
| 2016/0229060 A1 | 8/2016 | Kim et al. | |
| 2016/0271795 A1 | 9/2016 | Vicenti | |
| 2016/0282873 A1 | 9/2016 | Masaki et al. | |
| 2016/0297072 A1 | 10/2016 | Williams et al. | |
| 2016/0298970 A1 | 10/2016 | Lindhe et al. | |
| 2017/0001311 A1 | 1/2017 | Bushman et al. | |
| 2017/0083022 A1 | 3/2017 | Tang | |
| 2017/0147000 A1 | 5/2017 | Hoennige et al. | |
| 2017/0164800 A1 | 6/2017 | Arakawa | |
| 2017/0177001 A1 | 6/2017 | Cao et al. | |
| 2017/0197314 A1 | 7/2017 | Stout et al. | |
| 2017/0231452 A1 | 8/2017 | Saito et al. | |
| 2017/0273528 A1 | 9/2017 | Watanabe | |
| 2017/0364087 A1 | 12/2017 | Tang et al. | |
| 2018/0004217 A1 | 1/2018 | Biber et al. | |
| 2018/0074508 A1 | 3/2018 | Kleiner et al. | |
| 2020/0348666 A1 | 11/2020 | Han | |

FOREIGN PATENT DOCUMENTS

| | | |
|---|---|---|
| CN | 1381340 | 11/2002 |
| CN | 1696612 | 11/2005 |
| CN | 101920498 | 12/2010 |
| CN | 101945325 | 1/2011 |
| CN | 101972129 | 2/2011 |
| CN | 102407522 | 4/2012 |
| CN | 102738862 | 10/2012 |
| CN | 102866706 | 1/2013 |
| CN | 103885444 | 6/2014 |
| CN | 203672362 | 6/2014 |
| CN | 104115082 | 10/2014 |
| CN | 104460663 | 3/2015 |
| CN | 104634601 | 5/2015 |
| CN | 104765362 | 7/2015 |
| CN | 105045098 | 11/2015 |
| CN | 105334847 | 2/2016 |
| CN | 105467398 | 4/2016 |
| CN | 105527619 | 4/2016 |
| CN | 105593775 | 5/2016 |
| CN | 105990876 | 10/2016 |
| DE | 4421805 | 8/1995 |
| DE | 10204223 | 8/2003 |
| DE | 10261787 | 1/2004 |
| DE | 60002209 | 3/2004 |
| DE | 69913150 | 8/2004 |
| DE | 102007016802 | 5/2008 |
| DE | 102008028931 | 6/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102010033768 | 2/2012 |
| DE | 102011050357 | 2/2012 |
| DE | 102012201870 | 8/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 202014100346 | 3/2014 |
| DE | 102012112035 | 6/2014 |
| DE | 102012112036 | 6/2014 |
| DE | 102013100192 | 7/2014 |
| DE | 102014110265 | 7/2014 |
| DE | 102014113040 | 9/2014 |
| DE | 102013104399 | 10/2014 |
| DE | 102013104547 | 11/2014 |
| DE | 102015006014 | 5/2015 |
| DE | 102014012811 | 10/2015 |
| DE | 102015119501 | 11/2015 |
| DE | 102014110104 | 1/2016 |
| DE | 102016102644 | 2/2016 |
| DE | 102016114594 | 2/2018 |
| DE | 102016125319 | 6/2018 |
| EP | 142594 | 5/1985 |
| EP | 402764 | 12/1990 |
| EP | 0769923 | 5/1997 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2498158 | 9/2012 |
| EP | 2502539 | 9/2012 |
| EP | 2511782 | 10/2012 |
| EP | 2515196 | 10/2012 |
| EP | 2573639 | 3/2013 |
| EP | 2595024 | 5/2013 |
| EP | 2740013 | 6/2014 |
| EP | 2741159 | 6/2014 |
| EP | 2853976 | 4/2015 |
| EP | 2752726 | 5/2015 |
| EP | 2870852 | 5/2015 |
| EP | 3079030 | 11/2015 |

(56) References Cited

FOREIGN PATENT DOCUMENTS

| | | |
|---|---|---|
| EP | 3156873 | 4/2017 |
| EP | 3184013 | 6/2017 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2003330543 | 11/2003 |
| JP | 2004133882 | 4/2004 |
| JP | 2005205028 | 8/2005 |
| JP | 2009238055 | 10/2009 |
| JP | 2010227894 | 10/2010 |
| JP | 2013077088 | 4/2013 |
| JP | 2013146302 | 8/2013 |
| JP | 2014176260 | 9/2014 |
| JP | 201541203 | 3/2015 |
| KR | 100735565 | 5/2006 |
| KR | 100815545 | 3/2008 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | 2007028667 | 3/2007 |
| WO | 2012099694 | 7/2012 |
| WO | 2012157951 | 11/2012 |
| WO | 2013116887 | 8/2013 |
| WO | 2014017256 | 1/2014 |
| WO | 2014043732 | 3/2014 |
| WO | 2014055966 | 4/2014 |
| WO | 2014113091 | 7/2014 |
| WO | 2014138472 | 9/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

Vasquez-Gomez et al., "View planning for 3D object reconstruction with a mobile manipulator robot," 2014 IEEE/RSJ International Conference on Intelligent Robots and Systems, Sep. 14, 2014 IEEE, pp. 4227-4233.

The State Intellectual Property Office of People's Republic of China, "First Office Action," and English translation thereof, issued in Chinese Patent Application No. 2017800614024, dated Aug. 23, 2021, document of 15 pages.

Choset et al., "Principles of Robot Motion", Theory, Algorithms, and Implementations, Chapter 6—Cell decompositions, 2004, document of 41 pages.

Durrant-Whyte et al., "Simultaneous Localization and Mapping (SLAM): Part I the Essential Algorithms", in: IEEE Robotics and Automation Magazine, vol. 13, No. 2, pp. 99-108, Jun. 2006.

Kim et al., "User-Centered Approach to Path Planning of Cleaning Robots: Analyzing User's Cleaning Behavior." Proceedings of the 2007 ACM/IEEE Conference on Human-Robot Interaction, Mar. 8-11, 2007, pp. 373-380.

Konolige et al., "A Low-Cost Laser Distance Sensor," 2008 IEEE International Conference on Robotics and Automation, Pasadena, CA, USA, May 19-23, 2008, document of 7 pages.

Oh et al., "Autonomous Battery Recharging for Indoor Mobile Robots," Massachusetts Institute Of Technology Press, Aug. 30, 2000, document of 6 pages, XP055321836.

Siegwart, "Introduction to Autonomous Mobile Robots", Massachusetts, ISBN 978-0-26-219502-7, (2004), pages 104-115, 151-163, 250-251, document of 37 pages. http://www.robotee.com/EBooks/Introduction_to_Autonomous_Mobile_Robots.pdf, XP055054850.

Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages. http://dx.doi.org/10.1145/2737095.27

Neto et al., Human-Machine Interface Based on Electro-Biological Signals for Mobile Vehicles, 2006, IEEE, p. 2954-2959 (Year: 2006).

Forlizzi, How robotic products become social products: An ethnographic study of cleaning in the home, 2007, IEEE, p. 129-136 (Year: 2007).

German Patent Office, "Office Action" issued in German Patent Application No. 10 2016 114 593.9, dated Mar. 31, 2017, document of 8 pages.

World Intellectual Property Office, "International Search Report" and English translation thereof, issued in International Application No. PCT/EP2017/069827, document of 15 pages, dated Oct. 18, 2017.

World Intellectual Property Office, "Written Opinion of the International Searching Authority" and English translation, issued in International Application No. PCT/EP2017/069827, by European Searching Authority, document of 19 pages, dated Dec. 13, 2017.

Mahyuddin et al., "Neuro-fuzzy algorithm implemented in Altera's FPGA for mobile robot's obstacle avoidance mission", TENCON 2009—2009 IEEE Region 10 Conference, IEEE, Piscataway, NJ, USA, Jan. 23, 2009; document of 6 pages.

* cited by examiner

METHOD FOR CONTROLLING AN AUTONOMOUS MOBILE ROBOT

CROSS REFERENCE TO RELATED APPLICATIONS

This application is a § 371 National Phase of PCT/EP2017/069827, filed Aug. 4, 2017, which is incorporated by reference and which claims priority to German Patent Application No. 10 2016 114 593.9, filed Aug. 5, 2016 and German Patent Application No. 10 2016 114 594.7, filed Aug. 5, 2016.

TECHNICAL FIELD

The embodiments described here refer to an autonomous mobile service robot such as, e.g. a robot for processing a surface (cleaning floors) or for monitoring and inspecting an area that navigates using one or more maps.

BACKGROUND

In recent years, autonomous mobile robots, in particular service robots, are being increasingly employed in the household, for example for the cleaning or monitoring of an apartment. In such cases systems are employed that compile a map of the environment that is used together with a SLAM algorithm for navigation (*Simultaneous Localization and Mapping*, see, e.g. H Durrant-Whyte and T Baily: "*Simultaneous localization and Mapping (SLAM): Part 1 The Essential Algorithms*" in *IEEE Robotics and Automation Magazine*, Vol. 13, No. 2, pgs. 99-110, June 2006). Here a map, as well as the location of the robot on the map, is determined with the aid of sensors (e.g. laser range scanners, cameras, contact sensors, odometers, acceleration sensors, etc.). In many cases, only a temporary map is compiled, meaning that the map is compiled anew for each work sequence.

As opposed to temporary maps, using permanently stored maps makes it possible to deploy the robot more efficiently by eliminating the need to repeatedly explore the environment in order to compile a map and by permitting an optimized strategy for carrying out the operation to be calculated in advance. In order to formulate this strategy, additional information regarding the specifics of the environment can be determined, recorded on the map, and then made available for use again during subsequent work sequences. In this way the robot, for example, can recognize heavily soiled areas and clean these areas more often or more intensely in subsequent work sequences. The map can be further supplemented with user-specific information that is permanently recorded on the map, such as areas that should be treated with greater intensity and areas that are not to be entered at all.

The advantages of permanently recorded maps have been countered by various problems that, until now, have prevented them from being widely used in private households. One problem might be, for example, that the robot is deployed by the user in different environments (e.g. on different floors of a multistory house). In such cases the robot must be able to manage the use of numerous maps and to reliably determine whether it is located on one of the maps and, if so, on which of these maps it is presently located. This capability is also known as "Global Self-Localization" (see e.g. "*Active Global Localization for a Mobile Robot using Multiple Hypothesis Tracking*" in *IEEE Transactions on Robotics and Automation*, 2001). However, known methods of global self-localization are time consuming and delay the robot's execution of the operation itself.

A further problem may be, for example, that the robot's environment in an apartment, and thus the corresponding map of this environment, constantly changes. Such changes may be caused, for example, by shifted household items such as, e.g. chairs, open and closed doors, as well as new items of furniture or the removal of others. Accordingly, the objective of the present application can be seen, inter alia, as providing a robust management of permanently stored maps in changing environments and improving the robot's self-localization on the maps.

SUMMARY

The aforementioned objective is achieved with a method in accordance with claim 1, 6, 24, 28, 30, 53 or 57, and with a control unit in accordance with claim 29 or 60. Various embodiments and further developments are the subject matter of the dependent claims.

A method for controlling an autonomous mobile robot is described. In accordance with one embodiment the method comprises permanently storing and managing at least one map corresponding to an area of robot deployment and receiving an assignment by the robot to carry out a task in an area of robot deployment for which a stored map exists. The method further comprises determining the map needed to carry out the task and the position of the robot on the determined map (global self-localization). Further, a working copy of the determined map is generated and then used to navigate the robot through the area of robot deployment while it carries out its task. This navigation includes gathering information on the robot's environment and current movement by means of sensors, continuously determining the location of the robot based on the gathered information and updating the working copy of the map when changes in the environment are detected (e.g. by means of SLAM). The permanently stored map, however, remains unchanged.

Further, a method for the self-localization of an autonomous mobile robot on at least one permanently stored map of at least one area of robot employment is described, wherein the robot determines whether and/or where it is located on the at least one map. In accordance with one embodiment, the method comprises detecting differences between the at least one permanently stored map and the actual environment in the respective area of robot deployment as determined by the robot. The detected differences are analyzed to determine whether they were caused by a movable object. Depending on the results of this analysis, the robot either determines its position on the at least one permanently stored map or it rejects the self-localization.

In accordance with one embodiment the method for self-localization comprises identifying similar and/or identical areas within one or more maps. The method further comprises determining whether the robot is located in one of these similar areas. The robot waits to finally confirm which map it is located on and at what position until it has recognized a conclusively distinguishing feature. The robot does not begin carrying out an assigned task until it has determined its position within the similar area.

A further method for controlling an autonomous mobile robot is additionally described. In accordance with one embodiment, the method comprises storing and managing of at least one map corresponding to at least one area of robot deployment and navigating the robot through the area of robot deployment, during which the robot constantly determines its position on the map. The method further comprises detecting a shift in position that occurs when the robot carries out a movement that it cannot control on its own. During this shift in position the robot gathers information on its position and/or current movement and determines—based on the gathered information—an estimated value for its position.

In accordance with one embodiment the method for controlling an autonomous mobile robot comprises storing and managing of two or more maps corresponding to areas of robot deployment, wherein the areas of robot deployment have differing altitudes. The robot navigates through the area of robot deployment while constantly determining its position on the respective map. The method further comprises detecting the air pressure and well as analyzing the detected air pressure to determine—based on changes in the air pressure—whether the robot has left its current area of deployment.

In accordance with a further embodiment the method for controlling an autonomous mobile robot comprises storing two or more maps corresponding to areas of robot deployment, wherein the areas of robot deployment have differing altitudes. The robot measures the air pressure and analyses the measured air pressure. Following this the robot can select a map of the area of robot deployment and use it to navigate.

In accordance with a further embodiment the method for controlling an autonomous mobile robot comprises storing and managing at least one map corresponding to at least one area of robot deployment. The method further comprises receiving an assignment for the robot to carry out a task, wherein the task may belong to a first group of tasks or to a second group of tasks. In order to complete its task, the robot navigates through the area of robot deployment. Tasks from the first group are linked to map-based information and the robot navigates using the stored map while carrying out the task. Tasks from the second group are not linked to map-based information.

A method for controlling an autonomous mobile robot is described. In accordance with one embodiment the method comprises permanently storing and managing at least one map corresponding to an area of robot employment and receiving an assignment for the robot to carry out a task in an area of robot deployment for which a stored map exists. The method further comprises determining the map that is needed to carry out the task and the position of the robot on the thus determined map (global self-localization). Further, a new working copy of the determined map is generated, and the robot uses this working copy to navigate through the area of deployment while carrying out the task. This navigation also includes gathering information about the environment and current movement of the robot by means of sensors, constantly determining the position of the robot based on the gathered information, and updating the working copy of the map when changes in the environment are detected (e.g. by means of SLAM). The permanently stored map, however, remains unchanged.

Further, a method for the self-localization of an autonomous mobile robot on at least one permanently stored map of at least one area of robot deployment is described, wherein the robot determines whether and/or where it is located on the at least one map. In accordance with one embodiment the method comprises determining the differences between the at least one permanently stored map and an actual environment within the respective area of robot deployment as detected by the robot. The determined differences are analyzed to determine whether they were caused by a movable object. Depending on the results of this analysis, the robot determines its position on the at least one permanently stored map or it rejects the self-localization.

In accordance with one embodiment the method for self-localization comprises identifying similar and/or identical areas on one or more maps. The method further comprises determining that the robot is located in one such similar area. The robot then waits to finally decide which map it is located on and at what location until it recognizes a distinct distinguishing feature. As soon as but not before it has determined its position in the similar area, the robot begins to carry out an assigned task.

A further method for controlling an autonomous mobile robot is described in addition. In accordance with one embodiment the method comprises storing and managing at least one map corresponding to an area of robot deployment and navigating the robot through the area of deployment while the robot continuously determines its position on the map. The method further comprises detecting a shift in position that occurs when the robot carries out a movement that it cannot control on its own. During this shift in position the robot gathers information on its position and/or current movement and determines—based on the gathered information—an estimated value for its position.

In accordance with one embodiment the method for controlling an autonomous mobile robot comprises storing and managing two or more maps corresponding to areas of robot deployment, wherein the areas of deployment have differing altitudes. The robot navigates through the area of robot deployment while constantly determining its position on the respective map. The method further comprises measuring the air pressure, as well as analyzing the measured air pressure and determining—based on changes in the air pressure—that the robot has left its current area of deployment.

In accordance with a further embodiment the method for controlling an autonomous mobile robot comprises storing maps corresponding to two or more areas of robot deployment, wherein the areas of robot deployment have differing altitudes. The robot measures the air pressure and analyzes the measured air pressure. Based on the results of the analysis, the robot can select a map of an area of robot deployment and use it for navigation.

In accordance with a further embodiment the method for controlling an autonomous mobile robot comprises storing and managing at least one map that corresponds to at least one area of robot employment. The method further comprises receiving an assignment for the robot to carry out a task, wherein the task may belong to a first group of tasks or to a second group of tasks. The robot navigates through the area of robot deployment while carrying out the task. Tasks of the first group are linked to map-based information, and while carrying out the task, the robot navigates using the stored map to which the map-based information refers. Tasks of the second group are not linked to map-based information.

Further, a control unit for an autonomous mobile robot, as well as a robot with such a control unit, is described. In accordance with one embodiment the robot or the control unit for the robot comprises at least one processor and at least one memory containing software instructions that, when executed on the processor, cause the autonomous mobile robot to carry out one of the methods described here. Finally, a computer program product stored on a data storage device is described which, when executed by a processor, is capable of performing the methods described here.

BRIEF DESCRIPTION OF THE FIGURES

The application is described in the following with reference to the examples illustrated in the figures. The illustrations are not necessarily true to scale and the application is not limited to only the aspects illustrated here. Instead importance is given to illustrating the underlying principles of the application. The figures show.

DETAILED DESCRIPTION

Figure 1:
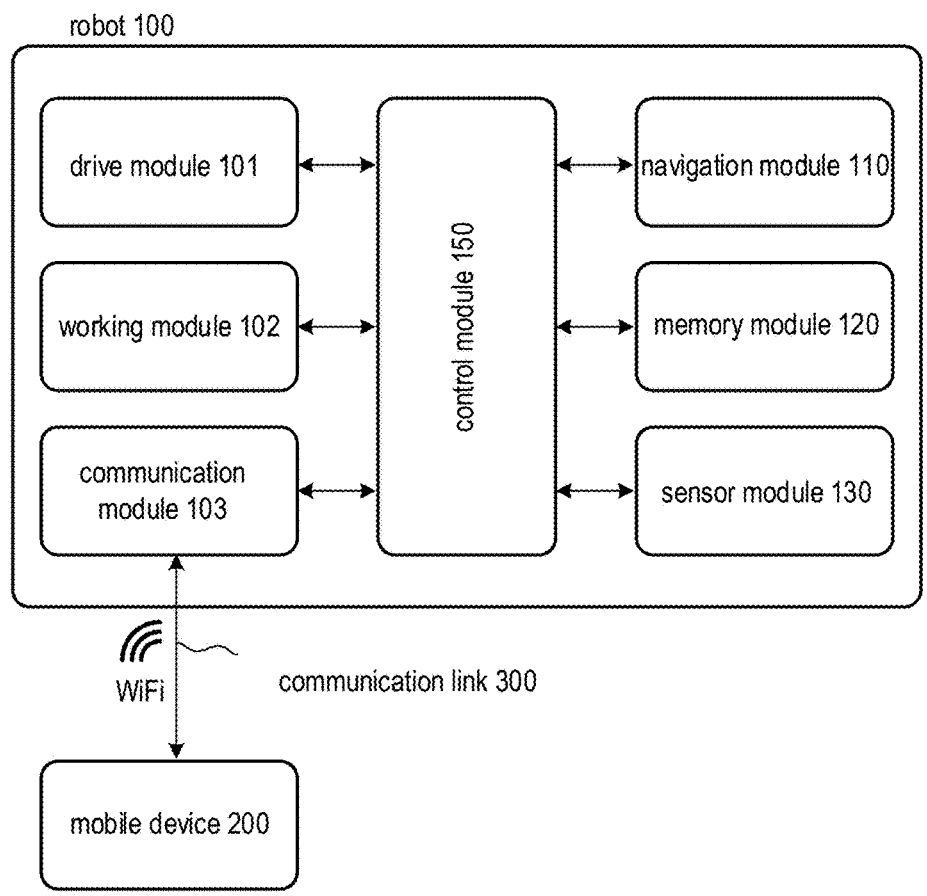
FIG. 1 is a block diagram illustrating an example of the structure of an autonomous mobile robot.

FIG. 1 uses a block diagram to illustrate an example structure of an autonomous mobile robot 100. The robot 100 can, as a service robot, automatically carry out one or more tasks such as, for example, the cleaning or monitoring of a household or the transport of objects within a household. The following ideas are described as examples of the deployment of a cleaning robot. They are not restricted to that scope, however, and can be implemented in any application in which an autonomous mobile work machine is required to carry out a task in an area through which it automatically moves (or navigates) using a map.

In general terms, an (electronic) map that can be used by the robot 100 is a data structure for storing location-related information specific to the robot's area of deployment and the robot's environment in this area of deployment. The kind of location-related information that may be stored in a map can be, e.g. information regarding the position of obstacles (e.g. walls, closed doors, pieces of furniture, a robot base station and other movable and non-movable objects, etc.) in an area of robot deployment. The location of obstacles is usually defined using coordinates and determined by the robot with, e.g. a SLAM procedure (metrical and topological map). Another type of location-related information is information, e.g. over which surfaces in the area have already been processed, in particular cleaned, what positions the robot moved to while carrying out its task, etc. One kind of location-related information is e.g. the partitioning of an area of deployment into numerous rooms. This partitioning can be performed automatically by the robot 100 or with the assistance of a user, who can carry out the portioning manually or can manually revise an automatically executed portioning. The designation of the rooms (e.g. "hallway", "kitchen", "living room", "bedroom", etc.) can also be stored in the map. One more kind of location-related information may be a further partitioning of the individual rooms into subareas (e.g. "dining nook", "entrance way", etc.) to which various attributes (e.g. "Keep out", "difficult to navigate", "heavily soiled" or the floor covering type) or schedules (e.g. cleaning intervals) may be assigned. Different maps can be stored for different areas of robot deployment (e.g. different maps may be stored for the different floors of a multistory house).

In accordance with the example shown in FIG. 1 the robot 100 comprises various modules. One of these modules may be a separate component (hardware), a software component for controlling the robot that carries out a desired task in a given area of robot deployment, or a combination of both (e.g. dedicated hardware with attached peripheral components and appropriate software/firmware). The software responsible for the robot's 100 behavior may be executed in the control module 150 of the robot 100 (using a corresponding processor and memory element) or be at least partially delegated to an external computer (e.g. personal computer, server, etc.) that can be accessed, for example, over a home network or the internet (cloud). In this way, if a certain operation or part of an operation is to be carried out "by the robot", the entire or part operation need not be handled exclusively by the hardware and software contained within the robot. It is also possible for the robot 100 (usually the control module 150 of the robot) to initiate the execution of the operation or part of the operation and for the operation or part operation to then actually be performed by external hardware and/or software (e.g. by an external computer or server that communicates with the robot via a data link). Here it should also be noted that the "intelligence" of the robot can also be distributed among the various modules, and need not necessarily be concentrated in a central control module. When a given operation or part of an operation is carried out "by the robot", the operation or part operation may be performed by a module of the robot (e.g. control module 150), jointly by numerous modules, and/or with the aid of external hardware and software.

In the present example the autonomous mobile robot 100 comprises a drive module 101 which may comprise, for example, electric motors, transmissions and wheels. With the aid of the drive module 101, the robot can—theoretically—access every point of its area of deployment. The robot 100 may further comprise a communication module 103 for setting up a communications link 300 to a human-machine interface (HMI) 200. The communications link 300 may be, for example, a direct wireless connection (e.g. Bluetooth), a local wireless network connection (e.g. WiFi or Zig-Bee) or an internet connection (e.g. to a cloud service). Examples of human-machine interfaces 200 include tablet PCs, smart phones, smart watches, computers and smart TVs. In some cases the human-machine interface 200 can also be integrated directly into the robot and can be operated using keys, gestures and/or voice input. The aforementioned external hardware and software may also be at least partially located within the human-machine interface 200.

The robot 100 may further comprise a working module 102 such as, for example, a cleaning module for the cleaning of a floor surface (brushes, vacuuming device) or a gripper for picking up and transporting objects. In the case, for example, of a telepresence robot or a monitoring robot, a working module 102 is not needed. Instead a telepresence robot possesses a more complex communication module 103 with a multimedia unit comprising, for example, microphone, camera and screen, with which it facilitates the communication among numerous persons over great distances. Another example is a monitoring robot that can recognize, while patrolling and with the aid of a sensor module 130, certain events (e.g. fire, light, unauthorized persons, etc.) and, for example, that can inform a monitoring station accordingly.

In order to be able to perform a task autonomously, the robot 100 in the present example has a navigation module 110 with which it can orientate itself in its environment, and thus navigate, using navigation features (i.e. features with which the robot can orient itself) such as, for example, land marks (e.g. pieces of furniture, door frames, corners of a room, etc.) that can be detected by the sensor module 130.

The navigation module 110 can operate, for example, using an obstacle avoidance strategy and/or a SLAM algorithm and/or numerous maps of the area of robot deployment. The map(s) of the area of robot deployment can be complied anew by the robot during deployment or it may use maps already existing at the time it begins its deployment. An existing map may have been compiled by the robot itself during an earlier deployment, for example, during an exploratory run or it may be provided by another robot and/or a person and can be permanently stored, for example, in a memory module 120. The memory module 120 comprises, first and foremost, a non-volatile memory (e.g. a solid state disk, SSD). As an alternative, the maps of the area of robot deployment may also be permanently stored outside of the robot, for example, on a computer in the household of the robot's user (e.g. a tablet PC, home server) or on a computer that can be accessed over the internet (e.g. a cloud server).

The sensor module 130 may comprise, for example, a sensor for measuring the distances to objects in the environment, for example, an optic and/or acoustic sensor that operates using triangulation or the travel time measurement of an emitted signal (triangulation sensor, time of flight camera, laser scanner, ultrasonic sensors). Other typical examples of suitable sensors include cameras, tactile sensors, acceleration sensors, gyroscopic sensors, odometers and/or ground clearance sensors.

In order that the robot may carry out its work without constant interaction on the part of the user, it may have, for example, a base station 190 to which it automatically returns after completing a task. Here it can, for example, charge its battery and/or dispose of dirt it has collected (in the case of a cleaning robot). The robot may have a central control unit that may include the control module 150 and, optionally, even more of the modules described above. In one example the control unit, for example, comprises, e.g. the control module 150, the navigation module 110 and at least some parts of the sensor module 130.

Figure 2:
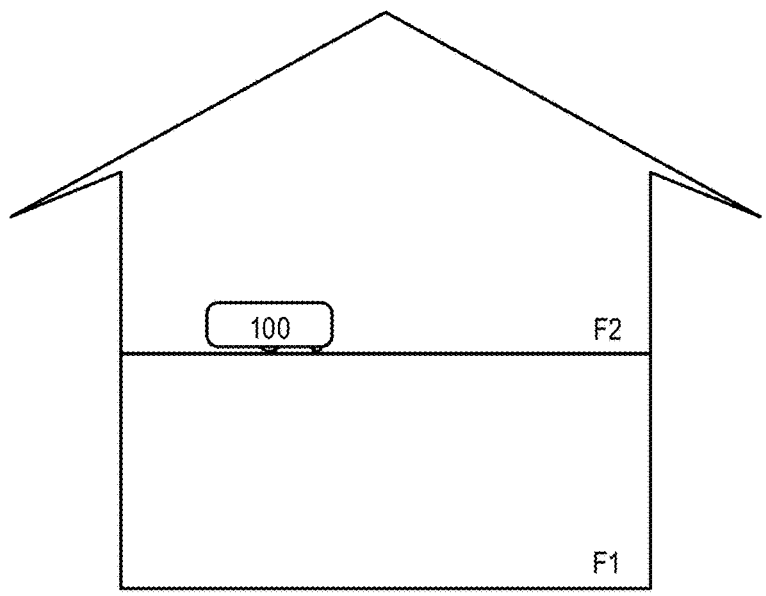
FIG. 2 schematically illustrates an example deployment of a robot in two different areas of deployment.

FIG. 2 shows a possible deployment scenario for an autonomous mobile service robot 100 that is deployed on two floors F1, F2 of a multistory house. In this particular case the two areas of robot deployment F1, F2 are spatially separate from each other, so that the robot cannot move automatically from one area of deployment to the other. The robot is moved from the first area of robot deployment F1 into the second area of robot deployment F2, for example, manually by a user or with the aid of other technical means, such as an elevator. Here it should be noted that the areas of robot deployment need not necessarily be two floors of a house. It is also possible for the individual rooms within an apartment to be separated by a threshold or steps that the robot cannot overcome without outside help. The areas of robot deployment may also be in completely separate locations such as, for example, in different houses (e.g. a city house, a weekend house).

In the systems currently commercially available, the robot 100 can be deployed in various areas of deployment, where it compiles a new temporary map during every deployment run. This is associated, however, with inefficiency, little flexibility and the insufficient "intelligence" and learning capabilities of the robot. In order to do away with these disadvantages, the maps compiled by the robot 100 can be permanently stored and used in subsequent deployments of the robot. This produces, inter alia, the following advantages:

Increased efficiency thanks to the speedier execution of a task and, consequently, a lower energy consumption, in particular due to
 the omission of repeated exploratory runs for the purpose of compiling the maps and
 the possibility of planning an efficient workflow in advance using known maps;
improved and simplified user interaction using the map, in particular due to
 recognition and designation of rooms and subareas (e.g. "living room", "bedroom", "dining niche"),
 specific work tasks regarding specifiable places such as, e.g. a particular room (e.g. "Clean living room."),
 designating danger zones ("keep out areas") that the robot may not enter on its own, and
 designating cleaning methods for the particular area (e.g. "Clean the dining niche twice a day.", "Clean the hallway using a stronger vacuum setting.");
the learning capabilities of the robot: For example, the robot can take note of quickly soiled areas and clean these more often. Further, the robot can also take note of places within the area of deployment at which it has gotten stuck and avoid these or travel through them more carefully.

In order that the robot be able to reliably handle one or more permanently stored maps, it must possess the following capabilities, at least:
1. compiling of new maps;
2. determining whether and if so, where it is located on the permanently stored maps (global self-localization), and
3. navigating using the maps (tracking its own position on the map, e.g. local self-localization).

A SLAM procedure can be used to realize both the first and the third capability. With this the robot constantly determines its location based on its movement and the known map data. Since, with this method, the position of the robot on the map is always determined based on a previously known position, one refers here to "local localization" or "position tracking". This local localization is thus based on a "previous knowledge" of the last known location. If the robot detects with its sensors new navigation features of the environment (e.g. obstacles such as walls or furniture) that are not yet recorded on the map, it adds these to the map data. To do so it can either compile a new map or adapt an already existing map to a changing environment. This allows for a robust navigation using a map in a variable environment in which, e.g. people or animals move, doors are opened or closed or obstacles such as chairs or scattered shoes are displaced.

The second aforementioned capability is of importance when the robot is moved or turned on anew and it must evaluate whether and if so where it is located on an existing map. This situation is also known as "lost robot problem" or "drop-off problem". This capability of determining the location of the robot with no or little previous knowledge (of the directly preceding position of the robot on the map) is called, in order to distinguish it from local localization in a the SLAM procedure, "global (self-) localization" (see, e.g. D. Filliat and J. Meyer: *"Map-based navigation in mobile robots: I. A review of localization strategies"*, in: *Cognitive Systems Research*, Vol. 4(4), 243-282, December 2003).

Numerous methods for global self-localization are known. For example, algorithms for the recognition of patterns ("pattern recognition and matching") are sometimes used. When carrying out the self-localization, the robot can begin, e.g. to compile a new map while checking for correlations with the maps relevant to the self-localization. For this purpose, for example, abstract metrics are defined that assess the difference between the maps in terms of various possible positions of the robot, wherein a value of zero describes a perfect correlation and thus a successful self-localization. Alternative variations might include determining a probability of the robot finding itself at a certain position on the map, wherein a value of one describes a reliable, successful self-localization. In practice this ideal value is rarely achieved. For this reason a threshold is generally selected and when the value falls below (or exceeds) it, it is assumed that the self-localization has been successful. If the discrepancies between the robot's environment and the existing maps are too large, it is concluded that the robot is not located within a mapped area of deployment.

In order that the robot 100 have an optimum starting basis for working with a permanently stored map, the robot 100 can carry out a learning run. Before starting the learning run, the user may be requested, e.g. to tidy up the area of robot deployment and to open all of the doors, so that the robot 100 may compile a complete map of its area of deployment containing as few inaccuracies as possible using a SLAM procedure. During the learning run, for example, the position of all obstacles (e.g. walls, furniture) in the area of robot deployment is established using distance measuring sensors. As an alternative or in addition to this, the robot may travel over the entire accessible surface of the area of robot deployment. In particular, the learning run may be combined with the performance of a task, for example, a cleaning. Still further, the user, for example, can provide the robot with information about its environment while it is carrying out the learning run or afterwards such as, e.g. the designation of the room in which the robot is currently located or that it should not enter a certain area of the room (defining a "keep out area").

After the learning run has been completed, additional location-based and map-based information can be determined with the aid of the user or automatically. When doing so, the map can be displayed to the user on the human-machine interface 200 (e.g. a tablet computer, cf. FIG. 1) so that he/she can confirm the map, identify and designate rooms. The displayed map can show simplified and revised data that was determined during the learning run. Alternatively, the map can be automatically evaluated with regard to consistency and a room can be divided up into subareas. For example, with the aid of a camera attached to the robot (e.g. as a component of the sensor module 130), doorways can be recognized and an automatic partitioning of the room can be generated based on the recognized doorways. In both cases, the goal is to recognize and avoid errors when compiling the map and to prepare the map for (later) user interaction. Finally, map data relating to the area of deployment (in which the learning run was carried out) is stored that represents both the current situation, as determined using the SLAM procedure, as well as additional, in particular personalized information (e.g. the subdivision and designation of rooms). This data can pertain to different levels of abstraction such as, e.g. metric data (e.g. the position of obstacles), topological data (e.g. positional relationship of recognized rooms) and semantic data (e.g. designation of the rooms). In alternative embodiments the robot 100 can also obtain the map from another robot (which, e.g. has already completed a learning run) and/or from the user.

Figure 3:
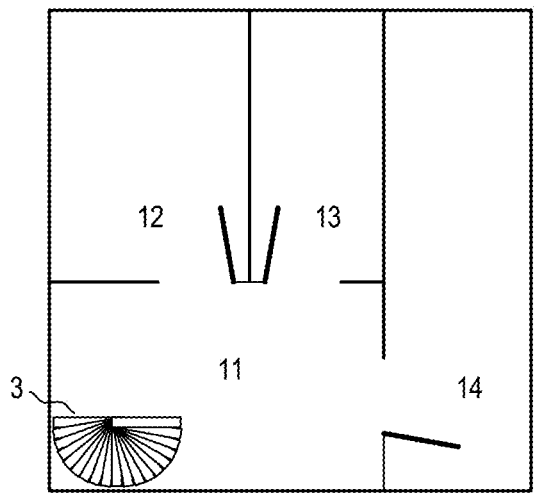
FIG. 3 shows examples of two maps that cover the two areas of robot deployment shown in FIG. 2.
Figure 3:
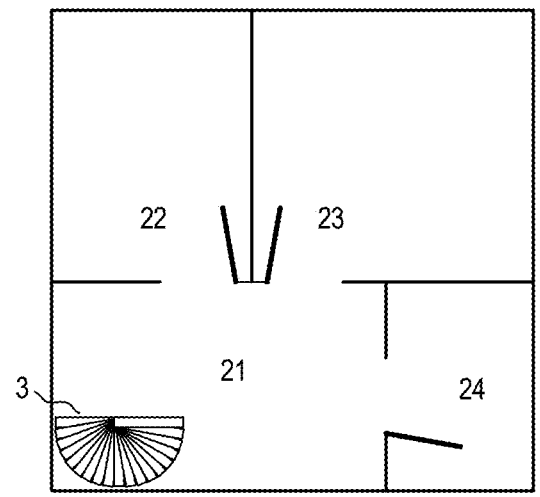

FIG. 3 shows examples of two maps 10, 20 that the robot has compiled, for example, on the floors F1 and F2 of the house of FIG. 2. The robot can permanently store these maps 10, 20 in a nonvolatile memory module 120 (see FIG. 1). The memory module 120 may contain, e.g. a memory chip such as, e.g. a flash memory installed within the robot 100. Alternatively or additionally the maps may be stored on an external device such as a computer (e.g. home server) or cloud service (internet server). As long as the robot 100 has easy and permanent access (e.g. via a wireless network connection or the internet) to the stored maps 10, 20, this sort of non-local storage is also regarded as a non-volatile memory. With reference to the embodiments described here, a map is permanently stored when it is saved in a non-volatile memory to be used again in one, or in any number of, robot deployments (e.g. after turning the robot 100 off and on again). Temporary maps, in contrast, are generally only kept in a volatile memory (e.g. in a RAM, Random Access Memory). Regardless of the storage device used, temporary maps are generally not available for reuse in later robot deployments.

As soon as one or more maps 10, 20 have been permanently stored, tasks linked to these maps (e.g. "Clean.") can be given to the robot. The task is relayed, for example, by means of a direct user command (e.g. an assignment for the robot to carry out a certain task) via the human-machine interface 200, by means of a specifiable command generated by a calendar function at a specifiable time, or by means of an "action" programmed into a home automation system ("smart home"). The starting point of the task may be, for example, a place chosen by the user or the robot's base station 190.

In general, the tasks carried out by robots and the respective assignments given to the robots can be divided into two groups. Assignments and tasks that are linked to map-based information (e.g. pertaining to one specific map among numerous others), to a certain region of a map (e.g. to a certain room) or to a specific position on the map belong to the first group of tasks and assignments. Assignments and tasks that are not linked to map-based information belong to the second group of tasks and assignments. If the robot receives a work assignment from the first group (a task linked to map-based information) it can, in accordance with one embodiment, navigate using any map to which the map-based information pertains. In this case, attributes recorded on the map (e.g. keep out areas, difficult to navigate areas, etc.) can be considered. If the robot receives a work assignment from the second group (tasks not linked to a map), it can compile a new map while carrying out the task. In this case, any attributes that might be recorded on some possibly existing map will not be considered. Alternatively the robot can verify whether it is in a mapped area of deployment and if it is it can use the corresponding map for navigation.

Before the robot 100 begins to carry out a task, it can, e.g. verify,
1. whether is linked to a mapped area of deployment F1, F2 and, if so,
2. whether the robot 100 is located within the area of deployment F1, F2 to which the task is linked and, if so,
3. where within the area of deployment F1, F2 to which the task is linked the robot 100 is located (global self-localization).

The task may be, for example, a general one that can be completed with any map and even in areas of deployment that have not been mapped. An example of this is a command to clean around the current area of deployment ("Clean."). In this case, points 2 and 3 above entail a global self-localization on all maps stored. If, in the process, the robot determines that it is located in an unmapped area of deployment, then it will compile a new map to use in carrying out its task. A further example of such a general task is to clean the entire accessible surface ("Clean all."), in particular with no regard given to any "keep out areas"

defined by the user. Before beginning to carry out such tasks the robot can verify whether, and if so where, it is located within a mapped area of deployment F1, F2, or it can always compile a new map.

The task that the robot is to carry out may also be linked to a specific location (e.g. "Clean living room."). In this case it is verified as to which map should be used (e.g. the map of the area of deployment in which the living room is located). In a simpler embodiment, information as to which map is to be used is provided immediately when the task is assigned. In this case there would be, for example, different commands ("Clean floor F1." and "Clean floor F2.") for each the tasks entailed in completely cleaning the areas of deployment F1, F2.

In point two it is first verified as to whether it is plausible that the robot 100 is located within the named area of deployment (plausibility test). This plausibility test might be conducted, for example, based on the last known location of the robot (e.g. the last deployment of the robot) and based on the results of the detection of a displacement of the robot. For example, the last deployment of the robot was on floor F1. It is then plausible that the subsequent deployment will also take place on floor F1, provided that the robot has not detected any displacement and that it was not completely turned off in the interim. However, if the robot detects (e.g. by means of a sensor) that it was moved by the user following its last deployment, it is also plausible that the deployment will take place on floor F2. If the robot does not detect any displacement following its last deployment, it is not plausible that the deployment will take place on floor F2. In such a case the robot can, for example, send a message to the user (e.g. "Please check my location.").

After this, the location of the robot on the at least one map intended for use is determined (global self-localization). If the self-localization fails, the robot can inform the user (as above), or it can carry out the task using a newly compiled temporary map.

Known systems use the determined (e.g. by means of global self-localization) stored map directly for the navigation of the robot, although two different approaches are followed. Either the map is left unchanged or it is adapted to changes in the environment (update of the stored map). Both approaches have their advantages and disadvantages. For a reliable navigation it is namely essential that the map represents the area of robot deployment as accurately as possible. Accordingly, it can be an advantage when, for example, a new position of the base station 190 or new obstacles are recorded on the map. This, however, can also result in temporary changes such as, for example, a closed door, being recorded on the map. As a consequence of this it would not be possible to plan a path for the robot into the room behind the door for a subsequent deployment without first having surveyed it. In the worst of cases, the map could be rendered unusable for future robot deployments because of problems with the robot, such as when it commits measurement errors or uses the map in the wrong area of deployment.

In order to avoid such problems, a working copy of at least a part of the permanently stored map 10, 20 can be generated at the beginning of a work deployment. This will ensure that the map compiled during a learning run (reference map) remains unchanged and completely available for every subsequent deployment. At the same time, all of the changes in the environment can be taken into consideration in the working copy. In particular this entails deleting no longer existing navigation features, repositioning displaced ones and adding new navigation features. As mentioned previously, generating a working copy does not necessarily entail completely copying all of the information permanently stored as map 10, 20. In some cases a copy of the information needed for navigation (e.g. the obstacles previously identified by means of SLAM) may suffice.

The working copy can contain at least the map data that is relevant for the navigation. This may include, for example, the position of significant obstacles (e.g. walls, wardrobes) and/or the position of navigation features (features with which the robot can orientate itself). Map data that does not change or that changes only slowly need not be included in the working copy. The room layout, for example, is information that is not needed for the orientation and navigation of the robot and which does not change. Furthermore, the location of chairs or shoes, for example, is highly variable and is therefore of no informational value for the navigation of the robot and need not be included in the working copy (in as much as this information is even contained in the permanently stored map). When proceeding as described above, an old working copy from a previous robot deployment may be left over. This can be deleted when a new working copy is generated.

The old working copy can be used to verify whether and if so, where the robot 100 is positioned within the area of deployment in question, for which the aforementioned plausibility test can be easily used. In particular, the robot's position on the old working copy of the map 10 or 20 can be carried over into the new copy. This is possible when both working copies are based on the same permanently stored map and the information on the robot's position is still valid (e.g. when the robot has neither been displaced nor turned off). By doing so the global self-localization can be omitted and the robot 100 can immediately begin carrying out its task.

In one possible embodiment it can be verified as to whether the old working copy of the map should be deleted or may be reused. For tasks that are restricted to a certain area it may make sense reuse an existing working copy. Such a task might be, for example, the cleaning of a single room or part of a room. If this room is accessible on the existing working copy of the map, the robot can use the latter when carrying out its task. A new working copy can be generated, for example, when the task concerns an area that cannot be accessed on the existing working copy such as, for example, a room that was inaccessible during the last deployment of the robot due to a closed door. In some other cases it may always make sense to delete the old working copy and to save a new working copy of the permanently stored map 10 or 20. This will be the case, for example, when the robot's 100 task entails accessing every region of the deployment area, as usually occurs, for example, when the entire area of robot deployment is cleaned or inspected.

It will also make sense to delete the old working copy and to save a new working copy of the permanently stored map 10, 20 if it must be assumed that the environment has changed as a result of human activity, in particular due to the closing and opening of doors leading to rooms. For this purpose a period of time can be defined (e.g. 5 hours), after the passage of which, without the reception of a work assignment (a command for the robot to carry out a certain task), the robot will generate a new working copy for any new assignment received. Further distinguishing features may be, e.g. the time of day or the presence and activity of people in the area of robot deployment. For example, the robot can be configured to detect people who are present (e.g. by means of personal mobile devices such as smart phones that with WLAN connection or by means of person recognition using a camera). If none of the people living in the household are present, or if they are sleeping, no changes in the area of deployment are to be expected and it may be expedient to use the old working copy. When people leave or enter the area of robot deployment (e.g. the house) this may bring about greater changes. Thus, for example, a user may leave a door open when leaving the apartment and expect the robot to clean the room behind it in the user's absence. In such a case it is essential for the robot to replace the old working copy, on which the door is marked as closed, with a new one that designates all of the rooms that are accessible.

It may happen that, during the global self-localization phase, the robot incorrectly determines the map and/or its location on it. This may occur if, for example, the robot is located in the hallway 11 on the floor F1 and it receives the command to carry out a task, for example, the cleaning of the room 24 located on the floor F2 and marked on the map 20. Since the robot was told to use map 20 the self-localization is carried out based on this map only. Due to the high degree of similarity between hallway 11 on map 10 and hallway 21 on map 20, the robot is successful in determining for itself a position on map 20 using the global self-localization, although it is actually located on the other floor—F1. When the robot then moves about in room 14 (under the assumption that it is moving about in room 24), it will detect large discrepancies between the room 24 mapped on the map 20 that it is using and the actual environment in room 14. During the SLAM procedure the navigation module 110 of the robot 100 would revise the working copy of the permanently stored map 20 by adapting the mapped position of partitions to their actual positions in rooms 13 and 14. Due to the fact that a working copy is used, the discrepancies between the permanently stored map and the working copy can be corrected using a normal navigation algorithm and without damaging the permanently stored map. In the present example, the robot would still carry out its task, albeit on the "wrong" floor (thus in room 14 instead of room 24). Using the working copy would nevertheless enable it to detect the mistake by comparing the working copy to the permanently stored map. The permanently stored map is left undamaged by the user's mistake, rendering the robot more robust against the user's operating errors.

In addition to this, using the working copy enables the robot to constantly verify, while carrying out a task, whether its self-localization was accurate or inaccurate (meaning, whether the robot is actually located in the area indicated on the map it is using). For this purpose, for example, as it changes during navigation, the working copy of the map 20 can be continuously compared to the permanently stored map 20. For this, for example, the same algorithms may be used as those used in the global self-localization to determine the location of the robot on the map. Alternatively or additionally, the adaptations required in the working copy of the map 20 can be evaluated. This means, for example, if a new or missing wall is detected, this will be a clear indication for the user of an erroneous map and/or position (as in the case in which room 14 is confused with room 24). Small changes, on the other hand, are the usual daily ones and/or commonplace measurement and navigation errors of normal dimensions.

Metrical and topological measurement functions can be used to distinguish the case in which the wrong map (that is, the map of a different area of deployment) is being used from cases in which discrepancies between the stored map and the actual measured conditions in the environment are caused by the aforementioned measurement and navigation errors. Metrical measurements, for example, detect the size (length) of newly identified or missing navigation features or the surface area of the regions affected by these changes. When, for example, the robot (as above) is located on floor F1 but navigates with the map 20 of floor F2, it will determine that the surface area of the mapped room 24 (which is actually room 14) has more than doubled in size. At the same time, the surface area of room 23 (which is actually room 13) will have been reduced by the same amount. Topological measurements determine the relative position of the identified rooms and of the identified rooms' boundaries. The boundary between room 13 and room 14 on map 10, for example, extends vertically, whereas the boundary between room 23 and room 24 on map 20 extends horizontally. The aforementioned metrical or topological measurements can be used to determine that the robot 100 is navigating with the wrong map.

If it is determined that the robot 100 is not located on the map it is using, there are various options for the next step. For example, it can interrupt the operation and return to its initial position (e.g. a base station), it can continue the operation or it can send a message to a user and request instructions. As a further alternative, the robot 100 can begin a new global self-localization among all the permanently stored maps. For this purpose it can make particular use of those parts of the current working copy that it has already moved through. For example, the map data may be provide with a time stamp with the aid of which the most current observations can be distinguished from older ones. This enables the robot to distinguish navigation features in the current working copy that stem from the permanently stored map from those that it has observed during its current run and which may therefore be relevant for the self-localization.

A further advantage provided by the working copy of the permanently stored map is that it improves learning ability. Accordingly, the robot can compare the map data of the working copy, updated during navigation, against the permanently stored map after finishing a task in the area of robot deployment. The detected changes can be dealt with, for example, in three different ways:

- by rejecting them without changing the permanently stored map,
- by noting them but without directly changing the permanently stored map,
- by directly recording them in the permanently stored map.

For example, it may be forgotten that certain rooms were inaccessible due to at least one closed door. Small changes that result from measuring inaccuracies or are caused by smaller movable obstacles (such as, e.g., a bag left standing somewhere) are not relevant and may be ignored (rejected). Other changes such as, for example, a change in the position of the base station, are so important they should be immediately included in an update of the permanently stored map.

A large portion of the changes cannot be immediately defined as "relevant" or "not relevant". Such changes are either linked to the permanently stored map and/or are saved. After every run, for example, the thus collected information is evaluated as to whether it should then be deleted, kept for further analysis or recorded as a change to the permanently stored map. Three such examples are explained in detail in the following.

Example 1—Learning about New Obstacles

A user may place a new obstacle such as a new piece of furniture or a package in the area of robot deployment. These obstacles would be detected by the robot using its sensors and it would adapt the working copy of the permanently stored map accordingly. By comparing the working copy to the permanently stored map the robot can identify the obstacle as new. It is, however, not immediately clear whether this obstacle will permanently remain at this location (such as, e.g. the new piece of furniture) or whether it will only temporarily or occasionally be there (such as, e.g. the package). For this reason, in accordance with one embodiment a new obstacle (e.g. the package or the new piece of furniture) can be saved when first encountered with reference to the map. It need not, however, necessarily be assumed in the next deployment of the robot that the previously saved obstacle will still be located at the location at which it was first encountered. In other words, the obstacle is not recorded in the permanently stored map in a way that would make it appear in a newly compiled working copy. If the obstacle is again encountered at least in the following deployment, it may be permanently saved on the map to be known for every following deployment of the robot. Before permanently saving a new obstacle on the map, the user can asked whether this is desired. If, in the following deployments, the obstacle is no longer present, the related information is rejected (deleted) and the permanently stored map remains unchanged. An analogous procedure may be used to identify obstacles that are no longer present and to delete them from the permanently stored map, for example, when the user removes a wardrobe from the area of robot deployment.

Example 2—Learning about Accessible Areas

Small mobile obstacles such as shoes left lying about or the legs of chairs complicate navigation for the robot, as they usually appear in numbers (a pair of shoes, numerous chairs at a table) and the robot is forced to carefully circumvent each one. This being the case, the floor surface of an area of robot deployment can be divided, for example, into regions that are most probably accessible for the robot and into regions that might be difficult to access due to the possible presence of small mobile obstacles. When the robot moves across the area of deployment from one part to another it can pass, to the extent feasible, through the easily accessible regions and avoid, to the extent feasible, the regions that are difficult to access. This allows the robot to travel at a greater speed and to avoid complicated situations such as the circumvention of numerous chair legs and thus increases the system's efficiency.

The specific location of small mobile obstacles is not relevant, as it may change from one deployment to the next. For this reason, such information is not recorded on and/or included in an update to the permanently stored map, or if so then only limitedly. In order to nevertheless learn which regions of the map this kind of obstacle is likely to be encountered in, after every work deployment, the location of small obstacles is determined based on the working copy of the permanently stored map and is linked to the map and/or saved. For this the working copy, for example, is compared to the permanently stored map and the location of all new obstacles whose maximum dimensions, for example, are smaller than those of the robot is determined. By combining the information from numerous robot deployments regions are revealed in which no small mobile obstacles are present and regions in which they are very densely present. This density, for example, may be taken as a measurement for categorizing the area of robot deployment into "easily accessible" and "difficult to access" regions. Corresponding attributes can be assigned to each region on the map. Analogously, the relative frequency with which small, temporarily present obstacles are detected in an area of robot deployment can be determined. Based on the determined relative frequency, a decision between the attributes "easily accessible" and "difficult to access" can also be made.

In order to be able to adapt the robot to the changing habits of the human user in the area of robot deployment, a time stamp, for example, is saved for the information regarding the location of small mobile obstacles. Measuring the extent to which the location of a small mobile obstacle need be considered then depends on the time at which it was encountered. For example, after a given period of time, the information regarding the location of the small mobile obstacle can be deleted or rejected ("forgotten").

Localization on numerous maps: In order that an autonomous mobile robot 100, with corresponding permanently stored maps 10, 20, be deployed in numerous, for the robot spatially separated, areas of robot deployment (e.g. the floors F1, F2 of a building), it must be capable of reliably determining whether it is located on any of the maps and if so, where it is located on the given map (global self-localization). To accelerate the global self-localization, the user can provide the information regarding the map that is to be used and the approximate starting position. This starting position might be, for example, the base station 190 or somewhere near it. When the robot 100, for example, is deployed in a two-story house (see FIG. 2) and is carried by a person over a flight of stairs 3 from floor F1 to floor F2, "near the flight of stairs", for example, can be chosen as approximate starting position. Thus the global self-localization can be limited to testing in particular possible locations of the robot on only part of a map representing, for example, the room linked to the starting position. The global self-localization can in this way be limited, for example, to the map segment of room 11 or room 21 (hallway) in which the flight of stairs 3 is located (see FIG. 3). Nevertheless, the required user input is of an inconvenience to the user and a source of potential errors.

A global self-localization is needed, for example, when the robot is displaced by the user (i.e. it has not automatically moved from one place to another). In order to make this global self-localization speedier and more reliable, in the embodiments described in the following:

the beginning and the ending of a robot 100 displacement is detected, during the displacement, information regarding the position and/or current movement of the robot is collected, and based on this collected information, the location of the robot on the stored map is estimated.

In a next step, an accelerated global self-localization can be carried out based on the estimated location of the robot 100 and the map(s) to be used, wherein the estimation (i.e. the estimated location of the robot) can be used in a way similar to the way information entered by the user is used. In some cases the estimation is so accurate that the global self-localization can be omitted and the estimation can be directly used as the starting point for the navigation, which allows the robot to begin carrying out its task much more quickly and thus increases its efficiency. During the estimation procedure, for example, a probability distribution for the location of the robot can be calculated. This will be, for example, a normal distribution characterized by an expectation value (expected location) and a standard deviation. The expectation value and the standard deviation can be determined. In addition to this, the relevant information collected during displacement can be used to determine whether the robot is still located in its last area of deployment or has been moved to a different one.

Detecting the beginning and ending of the displacement can be accomplished using the sensors of the robot's 100 sensor module 130. Various possibilities exist for this, for example:

Wheel contact switches detect whether the robot 100 is contacting the floor.

Ground clearance sensors (e.g. cliff sensors) detect whether there is a floor underneath the robot 100 and—in some embodiments—the distance between the floor and the robot.

Acceleration sensors measure the acceleration of the robot such as, e.g. the acceleration vertical to the floor when the robot is lifted up or the acceleration parallel to the floor when the robot is displaced. To improve reliability when detecting lifting or displacing movements, numerous sensors can be combined.

During displacement, information is collected by the sensors of the sensor module 130. This information regards the position of the robot and its movement such as, for example, acceleration, speed, orientation, angular velocity and height. The position of the robot can be estimated based on this data. To detect the aforementioned data, integrated MEMS gyroscopes and acceleration sensors, for example, can be used. Numerous such sensors can be combined into a so-called "inertial measurement unit" (IMU). The employed sensors will be discussed in detail further on.

In order to compensate, for example, for measurement errors of a sensor that are caused by signal interference, numerous sensors can be combined. Various methods of sensor and data fusion are known for this purpose. For example, the estimation can be carried out based on sensor data and using an (extended) Kalman filter, wherein the expectation value and the standard deviation of the robot's position are estimated (normal distribution). This allows an inference to be made regarding the accuracy of the estimation. As an alternative, a particle filter can be used to determine non-normally distributed probability distributions (see, e.g. S. Thrun: *Particle Filters in Robotics*, in: *Proc. of the 18th annual Conf on Uncertainty in Artificial Intelligence* (*UAI* 2002), San Francisco, Calif., S. 511-518, 2002).

During inertial navigation, acceleration and angular velocity for all three spatial dimensions are measured and from this (inter alia, by means of integration) a trajectory of the robot in the room and, accordingly, a change in position is detected. Starting from the known location at which the robot 100, for example, was lifted up by the user, the location at which the robot 100 is subsequently deposited can be estimated by means of inertial navigation. An IMU can function as a sensor for this. The unit may also include one or more acceleration sensors (accelerometers) and rotation rate sensors (angular rate sensors, e.g. gyroscopes) integrated, e.g. in a MEMS chip (micro-electro-mechanical systems). Inertial navigation functions very well across shorter distances (up to app. 10 m.). In the case of longer distances, inertial navigation can be combined with or replaced by other methods to improve the accuracy of the estimation. For example, the accuracy of the inertial navigation can be improved by determining the position and/or speed at one or more points in time using additional or alternative measuring methods (e.g. by means of Kalman filters).

One possibility is to use, e.g. a magnetometer that can be integrated in the IMU. With this, the earth's magnetic field can be detected and the robot's orientation relative to the field can be determined. When the direction of the gravitational force is also taken into account (e.g. with the aid of an inclination sensor), the robot's orientation relative to an absolute (spatially fixed) coordination system can be determined, thereby improving the accuracy of the location estimation (the estimation of the robot's 100 position after having been once again deposited on the floor).

Another possibility for determining the position consists in tracking the user's movement based on the measured change in position (determined from the acceleration and rotation rates measured by the IMU) of the robot 100 as the user carries and moves the robot. By these means it can be detected, for example, when a user walks around a corner or straight ahead, or up or down a flight of stairs. If, for example, it is detected that the user is climbing the flight of stairs (see FIG. 3, flight of stairs 3), it may be assumed that the area of robot deployment is changing (e.g. from floor F1 to floor F2). Furthermore, the location of stairs is clearly defined in most households. The position of the robot after the user has climbed the flight of stairs is thus known with an accuracy of app. one meter.

Either the robot will be deposited at the end of the stairs, in which case it can begin a self-localization using this information, or it will be carried further into a different area, which is to be determined by means of the aforementioned inertial navigation. Other typical patterns of movement can also be linked to positions within the room, for example, when the user walks straight through a long extended room, turns to enter a room through an open door or circumvents an obstacle such as a table that is standing in the room. In order to infer a particular movement on the part of the user from the data regarding the change in position and from this determine a position on the map, methods, for example, of machine learning are employed such as, e.g. neural networks. These are trained using real data gathered in various example situations, allowing certain patterns of movement to be learned and later detected. The area of robot deployment is analyzed to determine where these typical patterns of movement will take place, meaning where, for example, the stairs are located.

A further possibility for conducting and/or improving the position estimation is to determine at least one velocity component of the robot while it is being moved by the user. This is usually carried out, for example, with the aid of the sensors for detecting the environment that the robot uses in normal operation to orientate itself in its environment. This is, for example, a sensor for measuring distance such as, for example, an optical and/or acoustic sensor that operates using triangulation or travel time measurement of an emitted signal (triangulation sensor, time of flight camera, laser scanner, ultrasonic sensors). Since the robot detects its position relevant to other obstacles at a different distance than when it is resting on the floor, it is difficult to directly determine on this basis a position of the robot. However, at least a velocity component of the robot can be determined from the changes in the distances. This velocity can be used to correct the speed determined in the inertial navigation.

Another example of a sensor for detecting the environment is a camera. Using this, characteristic features of the environment can be recognized, for example, by means of edge detection. If the distances to these features are at least partially known, then by changing the position of these features in two consecutive camera photographs a change in the position of the robot and with this at least a velocity component of the robot can be determined. For example, the camera is pointed to the floor and recognizes it to be tiled. In this case the joints between the tiles are recognizable and their width, for example, is known or can be determined by the robot during "normal operations" (while moving over the tile floor).

A camera can also be used to directly carry out a position determination by identifying, by means of image and object recognition, features of the environment in the photographs that can be conclusively attributed to a certain position. Thus the camera may be pointed to the floor and recognize there a tiled floor. If this kind of tiled floor is only found in one room, the robot 100 can recognize that it is located in the room in question. From the transition from tiles to a different floor covering it can be inferred that the room, for example, is being exited through a door. From the viewing angle of the camera and the orientation of the robot 100 within the room a position of the robot can be determined. The orientation of the robot 100 in the room can be determined, e.g. with the aid of the IMU in that it measures the angular position of the robot 100 relative to the gravitational field of the earth and relative to the magnetic field of the earth.

One important information to be determined is whether the robot has been displaced within its current area of robot deployment, into different known area of robot deployment (for which a map has been stored) or into a new area of robot deployment (for which no map yet exists). For this purpose it is determined, for example, whether the (geographic) altitude before and after moving is identical or has changed. For example, by means of inertial navigation it can be determined that the robot was lifted up by approximately 3 m while being moved and therefore is now located on a different floor. The difference in height between two areas of robot deployment can be entered by the user, for example, based on standards used in the country of deployment or it can be learned automatically by the robot after having been moved once or twice. An altitude, for example, can be assigned to the map of a specific area of robot deployment, whereas the absolute height above the base height level (sea level) is irrelevant and only the difference between the various area of robot deployment is considered (e.g. area of robot deployment F1, map 10, height 0m, area of robot deployment F2, map 20, height 3 m). Thus, in this way the area of robot deployment can be conclusively identified in a single family home with three stories, for example, with the aid of a height measurement.

A change in the (geographic) altitude can also be determined, e.g. using a sensor for measuring air pressure. In particular, continuously measuring the air pressure and inferring from this the change in altitude during displacement can contribute to improving the accuracy of the inertial navigation. The accuracy of the measurement of the (geographic) altitude based on the air pressure can be disrupted, for example, by changes in the weather. To compensate for this and to obtain an absolute altitude measurement, the air pressure measured by the robot can be compared to the measurement of a permanent measurement station. The difference between the two measured values is independent of the current weather situation for every area of robot deployment, which allows for an accurate designation of the area of robot deployment. This permanent measurement station can be, for example, a weather station in a smart home that is connected to the robot via a communication link (e.g. WLAN).

When measuring the change in altitude the robot can also detect when it is placed at a critical height above an area of robot deployment, for example, when it has been raised, e.g. "only" by the typical height of tables and work surfaces of app. 80-120 cm. In this manner the robot can detect, e.g. that it is now on a table and, e.g. can send a warning to the user and/or move with particular care (e.g. slowly).

Self-Localization in a Dynamic Environment—

In a typical household the, for the robot, relevant environment may constantly change, e.g. as a result of the usage of the rooms by the human users. For example, the user may leave shoes lying in the hallway, may place a bag or a suitcase on the floor, may open and close doors or may move pieces of furniture (e.g. chairs). These changes can complicate a reliable self-localization of the robot if the differences between the currently detected environment and the permanently stored map become too great. Small mobile objects such as, e.g. scattered shoes, a bag left next to a wall or a moved chair, for example, can be ignored when carrying out the self-localization. In the event of larger changes in the environment resulting from, for example, an easily moved cabinet mounted on wheels (roll container) or a closed door that makes an entire room inaccessible, a self-localization based on metrics or a probability model may fail. To improve the reliability of the self-localization, the differences between a currently detected environment of the robot and the permanently stored maps on which the robot is to locate itself can be analyzed and evaluated to determine whether these differences were caused by a movable object.

Figure 4:
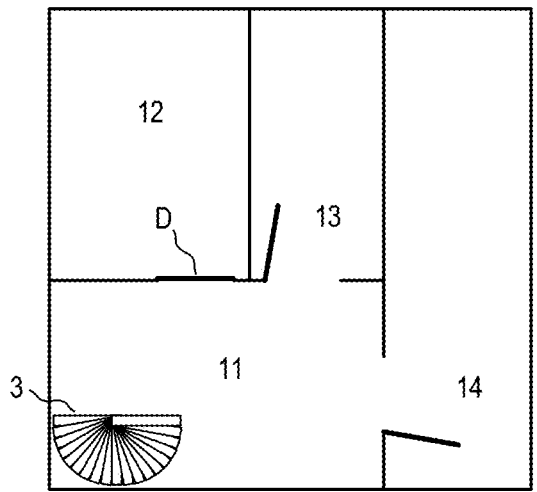
FIG. 4 shows an example of a permanently stored map and of a change in the mapped environment resulting from the closing of a door.
Figure 4:
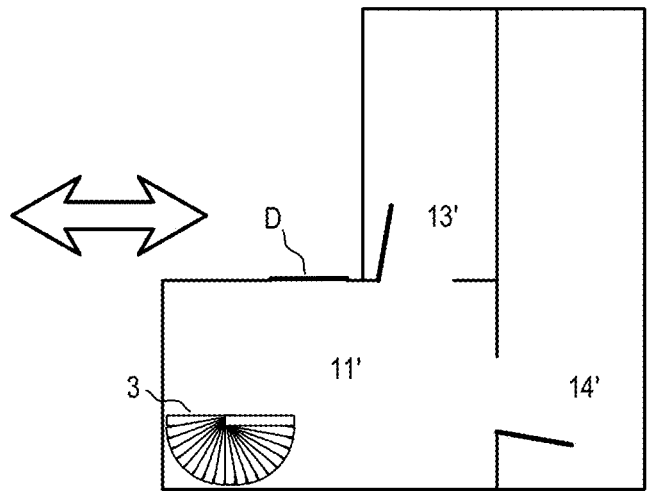

It should be noted that the following examples have been greatly simplified and are only intended to illustrate the underlying principle. In particular, the robot 100 need not explore the entire environment for the self-localization to be successful, but only a segment thereof. In the example shown in FIG. 4 (area of robot deployment F1, map 10), the room 12 is inaccessible due to a movable obstacle in the form of a closed door D. Due to the inaccessible room 12 the actual robot environment differs from the permanently stored map 10, which may cause the self-localization to fail. If, however, the map 10', without the inaccessible room, is used, the self-localization can be concluded successfully. For this purpose, for example, the modified map 10' of the area accessible when the door D is closed is calculated based on the location of doors and/or room boundaries marked on the permanently stored map 10. This can be generated with different variations of closed doors and these thus modified maps can be used to verify whether the self-localization on them was successful. The location of doors and/or room boundaries can be automatically determined when the map is compiled and/or can be entered by a user.

Alternatively, the closed door D can be directly identified using a camera and image recognition and the permanently stored maps intended for self-localization can be examined to determine, whether and if so where a door throughway is present and the self-localization can be carried out based on this information.

Figure 5:
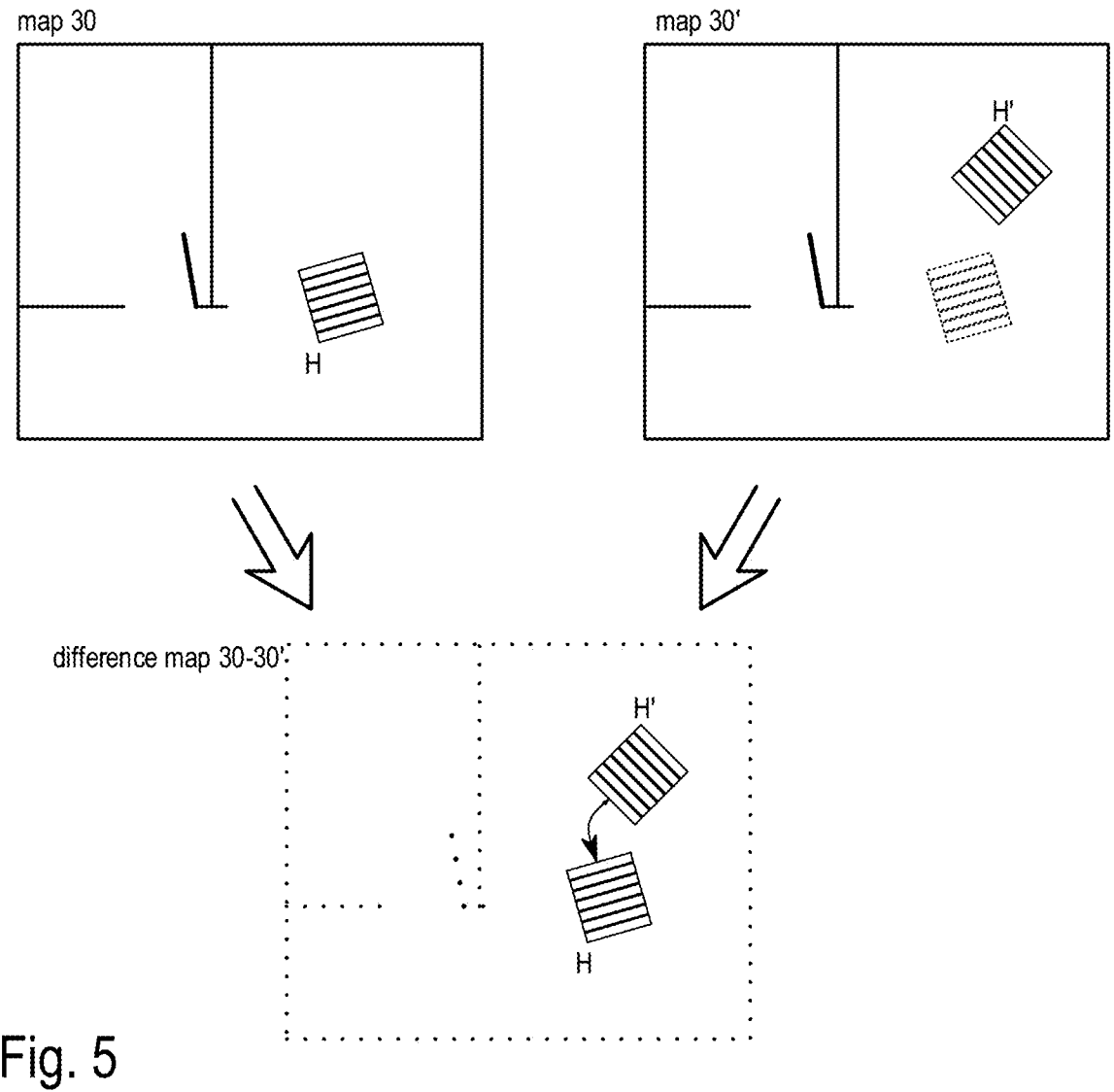
FIG. 5 shows an example of detecting movable objects on a permanently stored map.

FIG. 5 shows an example with a movable obstacle H in the form of a movable piece of furniture such as, e.g. a cabinet on wheels. This is so easily recognized that it is used for navigation and orientation in the environment. If the obstacle H is moved, the self-localization may fail, as, from the view of the robot, the obstacle H originally marked on the map 30 is missing and instead of this a new obstacle H' is detected at a place that was previously vacant (see map 30'). By analyzing the differences between the permanently stored map 30 and that of the robot's detected environment 30' it can nevertheless be recognized that the obstacle H' is the moved obstacle H. Thus, the difference map 30-30' between the permanently stored map 30 and that of the detected environment 30' can be generated, so that only the originally stored obstacle H and the obstacle H' that was moved in the recognized environment remain. The two, however, differ only in position and orientation and not in form or size. Based on this fact the robot can detect that there is only one (moved) obstacle. Further features of the obstacle H, which can be discerned by the sensor module 130 of the robot, can be used to recognize the obstacle. For example, the camera can record image information such as the color of the obstacle H and use this for recognition.

The as movable identified obstacle H can be marked as "movable" on the permanently stored map and can be ignored in future self-localizations or only limitedly used. Limitedly used means, for example, that the absence of the movable obstacle H does not lead to a worsened assessment of a possible (estimated) robot position. If the movable obstacle H' (that is, an obstacle of the same shape and/or size or with other features that can be detected by the robot) is detected at a different location in the area of robot deployment, this can lead to a further improvement of the assessment of a possible robot position and thus to a more reliable self-localization. Further, it is also possible to mark obstacles as moveable during or after the compilation of the map. A further possibility is that the robot photographs the obstacle with a camera, compares this picture against a data base of photographs and in this manner recognizes it as moveable.

Managing Similar Maps—

Figure 6:
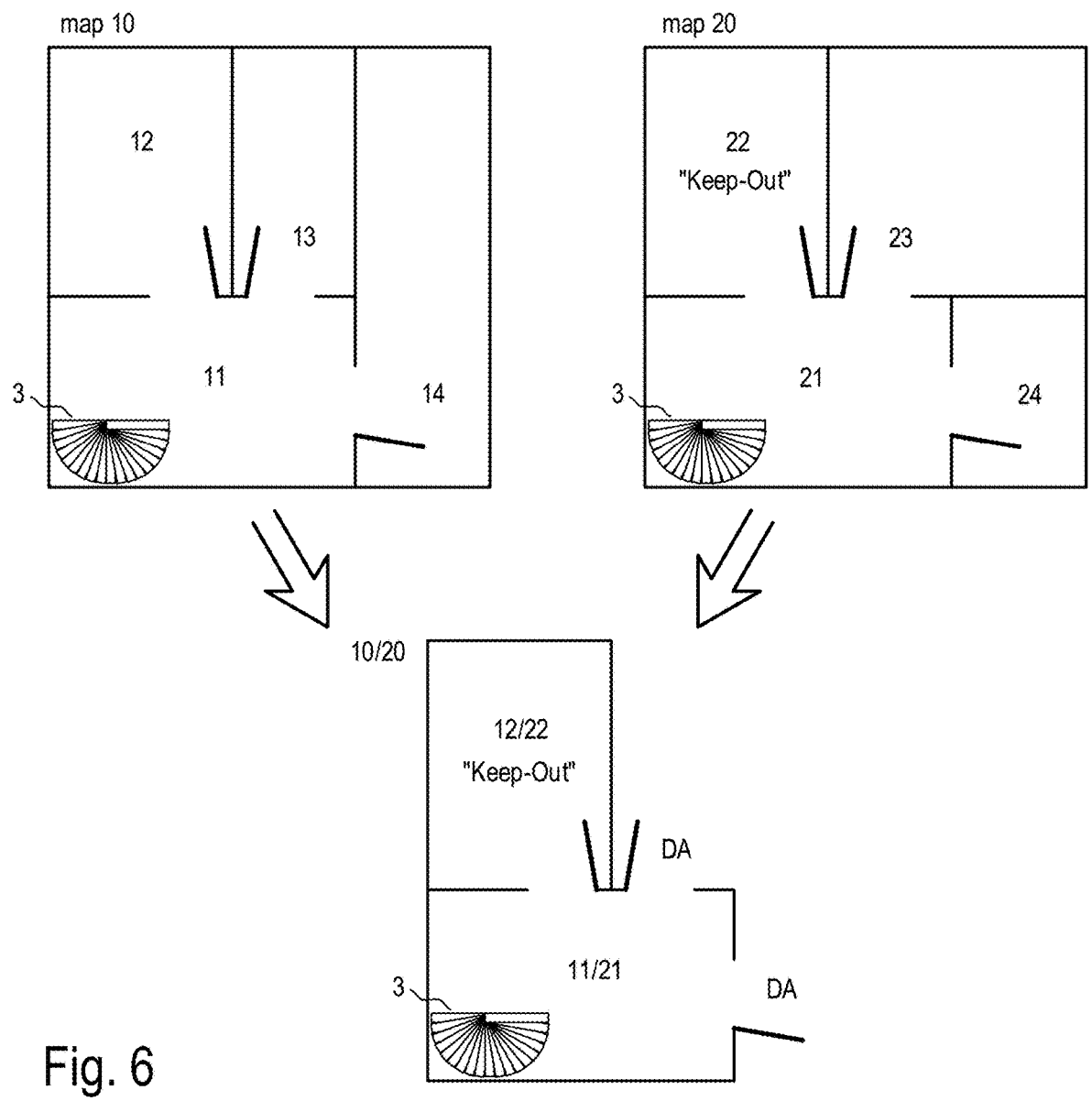
FIG. 6 illustrates an example of the generation of a partial map depicting similar areas within an area of robot deployment or two different areas of robot deployment.

Often the mapped areas of robot deployment are, at least in certain regions, similar. For example, the hallway and, in part, also the layouts of the rooms (floor plan) on various floors F1, F2 of a house are very similar (cf. FIGS. 2 and 3). With its limited sensor system, the robot 100 is only able to clearly differentiate between them at a few locations. FIG. 6 shows, for example, the maps 10, 20 of two floors F1, F2 of a house in which the hallways 11, 21 and the rooms 12, 22 are very similar and a differentiation based on the depicted floor plan is only possible in the rooms 13, 23 and 14, 24.

A further example is the deployment of the robot, e.g. in the hallway of a hotel (or of a hospital or a housing complex, etc.), in which many of the neighboring rooms have the same form and furnishings. In this case several very similar regions would be present on one map. If the robot is placed in one of the rooms it would not be able to definitively localize itself without leaving the room. The aim of the robot, however, is to begin its task, such as the cleaning of the hotel room, as quickly as possible. It should therefore not be necessary for the robot to leave the room first. To improve the self-localization, the permanently stored map can be analyzed to determine similar regions that do now allow for a definitive self-localization and the results can be saved in connection with the permanently stored maps 10, 20. This analysis need not be continuously repeated and only needs to be carried out, for example, when a new permanently stored map is generated or changes are carried out to an already existing map by the user and/or automatically. The analysis can be calculated by the robot, for example, during a work break while the battery is being charged or similar. Alternatively, it can also be carried out on an external computer in the user's household or in internet.

Numerous methods, for example, of pattern recognition can be used to analyze the permanently stored maps 10, 20. One possibility is to use the algorithms for self-localization to test the maps or parts thereof for similarities. In particular a room layout can be used to test individual rooms 11, . . . 14, 21, . . . 24 contained on the permanently stored map for similarities.

Alternatively, the permanently stored maps can be tested for similar regions that do now allow for a definitive self-localization with the aid of Monte Carlo simulations. In this process a simulation is performed of how the self-localization of the robot would proceed if it is placed on a random position on a map (e.g. map 10). By repeating this numerous times regions can be determined in which the robot quickly and reliably self-localizes and regions in which problems exists due to existing similarities.

The information regarding similar regions can be directly saved, for example, on the permanently stored maps. Alternatively one (or more) new partial maps 10/20 that cover the similar region can be generated. This partial map 10/20 can be used by the robot, for example, to carry out its task. This will be briefly described in the following using the example of a hotel hallway with numerous similar hotel rooms.

The user carries, for example, the robot into a hotel room to be cleaned, deposits it there and gives it the task "Clean the room and go to the base station". The robot begins its activity with a self-localization during which it determines that it is located in one of numerous similar hotel rooms. The partial map that corresponds to this room is then uploaded and the robot begins its activity based on this. After completing the cleaning the robot leaves the just cleaned hotel room (if possible) and continues the self-localization. By this process its position on the permanently stored map that contains the numerous similar hotel rooms is saved. In this manner it can be determined, which hotel room was just cleaned. A corresponding message can be sent, for example, to the hotel management. Additionally, using the permanently stored map the robot can determine, for example, where the base station is located and how it can be accessed in order to complete the task. In particular in the case of hotel rooms, the robot can determine its location, for example, with the aid of the room numbers intended for the hotel guests using a camera and the appropriate image recognition software. These room numbers can function as landmarks and/or be recorded as attributes (of those map regions that represent the rooms or of the entranceways to the rooms) on the corresponding map of the area of robot deployment.

A similar procedure can be followed in the example illustrated in FIG. 7. The aforementioned analysis of the maps 10 and 20 to determine similarities produces, e.g. a partial map 10/20 that contains, for example, the rooms 11/21 and 12/22. The robot 100 can be placed by a user in hallway 11 and be given the task "Clean". When it attempts to carry out the self-localization the robot determines that it is either in room 11 of map 10 or room 21 of map 20. Then the partial map 10/20 that represents the rooms 11 and 21 as 11/21 can be uploaded and the cleaning of the hallway can begin. After the cleaning of the hallway is completed, the robot can move into the next room (e.g. room 24) and continue its activity there. In this room the self-localization is continued in order to verify which of the two maps 10, 20 in question the robot is located on (in room 24, for example, that would be map 20).

The user may have the possibility of excluding individual regions and/or entire rooms from being automatically entered by the robot and/or from having the robot conduct a task there ("Keep Out Area"). For example, room 22 may be a children's room and the user may not want the robot to carry out an automatic cleaning there because of numerous small objects such as toys often to be found lying about. Thereby the problem arises that there is a similar region on the maps 10 and 20 containing the rooms 12 and 22 that nevertheless has to be treated differently. In accordance with the embodiment described here, the information concerning how subareas are to be treated (e.g. the information "Keep out" regarding room 22) that is saved with reference to the permanently stored maps 10 and 20 can be assigned a priority and can be treated correspondingly while working with the partial map. In this case information that serves to prevent the robot from causing damage (such as, for example, "Keep out") will receive a higher priority. In the preceding example, the robot would not enter the room 12/22 so designated on the map and would carry the corresponding information regarding the "keep out area" over into the partial map 10/20. Only after having definitively determined that the robot is located on map 10 would an automatic cleaning of the room now identified as room 12 begin. If it is determined that there are similar regions on the permanently stored map that make a reliable self-localization difficult, then it can also be tested to determine the regions in which there are distinct differences. If needed, the robot can immediately move to these regions in order to achieve a fast, distinct and reliable self-localization.

For example, on the maps 10 and 20 shown in FIG. 6, a definitive localization is possible in the rooms 13, 23 and 14, 24. This is recorded on the partial map 10/20 using the marking DA.

The invention claimed is:

1. A method for controlling an autonomous mobile robot comprising the following:
   storing and managing at least one map that corresponds to at least one area of robot deployment,
   receiving an assignment from a user to carry out a task by the robot, wherein the task belongs to a first group of tasks or to a second group of tasks,
   navigating of the robot through the area of robot deployment to carry out the task,
   wherein tasks from the first group are linked to map-based information, and wherein the robot navigates while carrying out the task using the stored map to which the map-based information refers,
   wherein tasks of the second group are not linked to map-based information, and
   wherein the robot is configured to carry out the first group of tasks and the second group of tasks,
   wherein the robot, in the case of tasks from the second group, compiles a new map for navigation before and/or while carrying out the task, wherein the robot tests before and/or while carrying out the task whether the robot is located within a mapped area of robot deployment, and if so, areas in the stored map that are marked as not accessible are considered when navigating and carrying out a task of the second group.

2. The method in accordance with claim 1,
   wherein the robot, in the case of tasks from the second group, tests before and/or while carrying out the task whether the robot is located within a mapped area of robot deployment and if so the robot uses a corresponding map for navigation.

3. The method in accordance with claim 1,
   wherein the robot, while carrying out tasks from the first group, only enters regions marked as accessible on the map and, while carrying out tasks from the second group, enters all accessible regions.

4. The method in accordance with claim 1, wherein the map-based information refers to:
   a certain one of numerous maps or
   one or more regions of a certain map or
   a specific location on a certain map.

5. The method in accordance with claim 1, wherein if the robot determines that the robot could be located in more than one mapped area of robot deployment, areas that are potentially not accessible are considered when navigating and carrying out a task of the second group.

* * * * *